Nov. 2, 1954   B. L. HAVENS ET AL   2,693,315
BOMBING COMPUTER
Filed Oct. 3, 1945
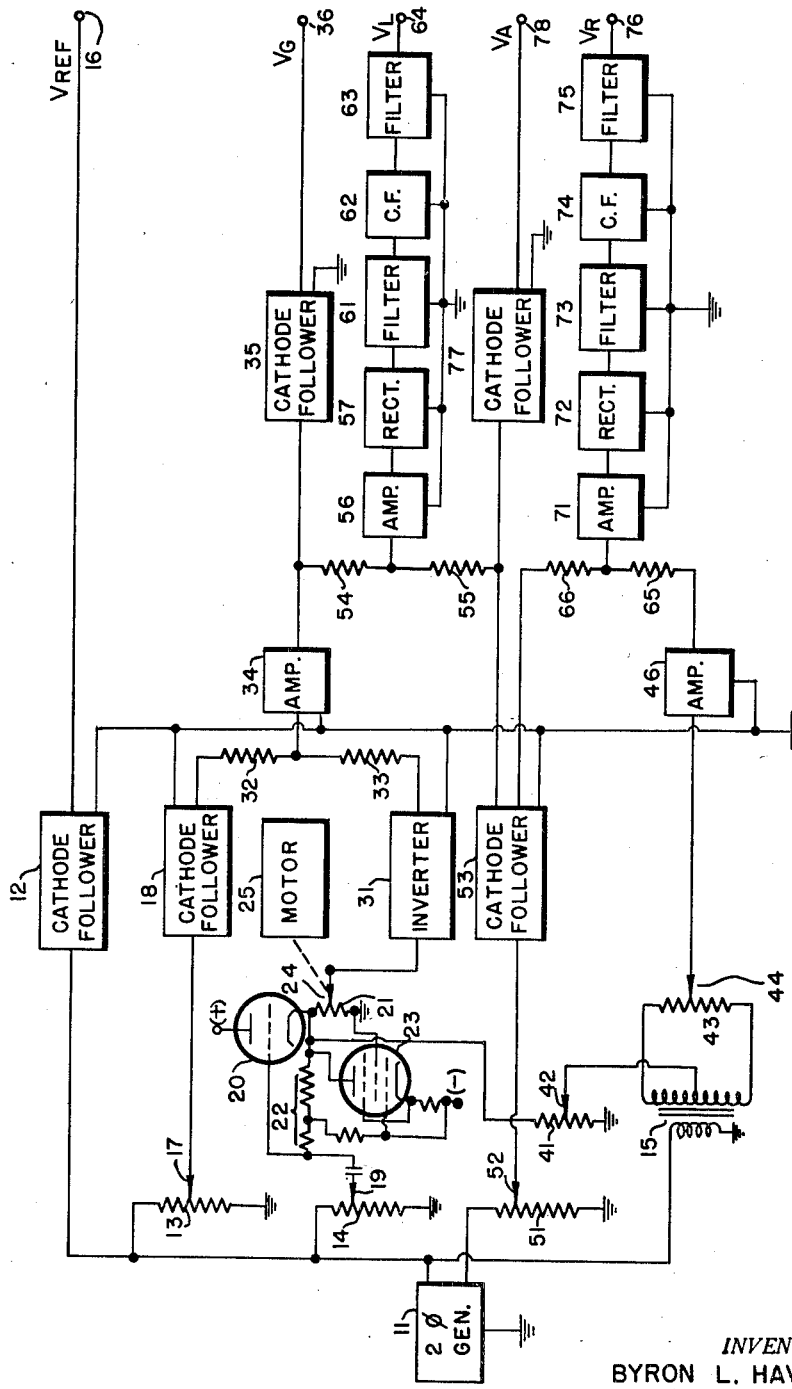
INVENTORS
BYRON L. HAVENS
JOHN J. LENTZ
BY
ATTORNEY

United States Patent Office 2,693,315
Patented Nov. 2, 1954

2,693,315

BOMBING COMPUTER

Byron L. Havens and John J. Lentz, Cambridge, Mass., assignors, by mesne assignments, to the United States of America as represented by the Secretary of War Application October 3, 1945, Serial No. 620,135

5 Claims. (Cl. 235—61.5)

This invention relates to computing devices and more particularly to electrical apparatus to be used in conjunction with a radar or radio object locating system, for computing data for determining the time at which bombs or other missiles should be released from an aircraft in order that they strike a designated target.

In low altitude bombing systems, such as disclosed and claimed in the copending application of Byron L. Havens and John J. Lentz, Serial No. 620,134, entitled "Electrical System," and filed October 3, 1945, now abandoned, it is generally desirable to have certain voltages available for use in other parts of the system. Such voltages generally include: $V_R$, a voltage proportional to the resultant slant range at which a bomb should be released; $V_A$, a voltage proportional to the altitude of the aircraft; $V_L$, a voltage proportional to the instantaneous slant range to the target; $V_G$, a voltage proportional to the instantaneous ground range to the target; and $V_{REF}$, a reference voltage. These voltages may be unidirectional or sinusoidal in nature; however, in the cited copending application $V_R$ and $V_L$ are unidirectional and the remaining are sinusoidal.

It is an object of the present invention, therefore, to provide an electrical apparatus for computing the resultant slant range at which a bomb should be released in order that it strike a designated target.

It is a further object of the present invention to provide voltages $V_R$, $V_A$, $V_L$, $V_G$ and $V_{REF}$, respectively, meeting the requirements set forth above.

For a better understanding of the invention together with other and further objects thereof reference is had to the following description taken in connection with the accompanying drawing which illustrates schematically the preferred embodiment of the present invention.

Referring now to the drawing, there is shown a two-phase generator 11, one phase of which is connected to a cathode follower 12, to potentiometers 13 and 14 and to the primary winding of a transformer 15. The generator 11 may be any suitable source affording two sinusoidal voltage outputs which bear a 90 degree phase relationship to each other. The output of cathode follower 12 is connected to a terminal 16 labeled "$V_{REF}$." A tap 17 on potentiometer 13 is connected to a cathode follower 18. A tap 19 on potentiometer 14 is connected to a control grid of a cathode follower tube 20 which has a potentiometer 21 as a part of its cathode load. The tube 20 is favorably biased through resistors 22 and a vacuum tube 23. The tube 23 is so connected between the cathode of tube 20 and a suitable source of negative potential that it provides essentially a constant current bias source. The potentiometer 21 is preferably linear, that is the resistance from a tap 24 to ground will vary linearly with time as the tap 24 is moved at a uniform rate by a motor or other suitable driving means 25. The tap 24 is electrically connected to an inverter amplifier 31. The output of cathode follower 18 and the output of inverter 31 are connected through resistors 32 and 33 to a suitable amplifier 34 whose output is passed through a cathode follower 35 to a terminal 36 labeled "$V_G$." The resistors 32 and 33 are so connected to the input of amplifier 34 that the algebraic sum of the output signals from the cathode follower 18 and inverter 31 is applied to the amplifier 34. From the top of potentiometer 21 or the cathode of tube 20 an electrical connection is made to a potentiometer 41 which also serves as a part of the cathode load of tube 20. A tap 42 on potentiometer 41 is connected to a tap on the secondary winding of transformer 15. It is to be understood that this transformer tap may also be established by use of a voltage divider network connected in parallel with the secondary winding of the transformer 15. A potentiometer 43 is connected across the secondary winding of transformer 15, and a tap 44 thereof is connected to a suitable amplifier 46.

The remaining phase of the generator 11 is connected to a potentiometer 51, a tap 52 of which is connected to a cathode follower 53. The outputs of amplifier 34 and cathode follower 53 are connected through resistors 54 and 55 to a suitable amplifier 56 which is in turn connected to a suitable rectifier 57. The resistors 54 and 55 are so connected to the input of amplifier 56 that the instantaneous algebraic sum of the output signals from the amplifier 34 and from the cathode follower 53 is applied to the amplifier 56. It will be seen that the input signal to amplifier 56 is in effect the vector sum of the two output signals. The rectifier 57 must have a linear rectification characteristic and should introduce a minimum of phase shift. The output of the rectifier 57 is connected through a filter 61, a cathode follower 62, and a filter 63 to terminal 64 labeled "$V_L$." The outputs of amplifier 46 and cathode follower 53 are connected through resistors 65 and 66 to an amplifier 71, the output of which connects to a rectifier 72, which is similar to rectifier 57. The resistors 65 and 66 are so connected that the signal at the input to amplifier 71 is substantially the vector sum of the output signals from amplifier 46 and cathode follower 53. The output from cathode follower 53 is shown on two leads since it may be desirable to present the output of the cathode follower 53 in two different magnitudes and to further permit individual adjustments to be made. The output of rectifier 72 is passed through a filter 73, a cathode follower 74 and a filter 75 to a terminal 76 labeled "$V_R$." The output of cathode follower 53 is also connected through a cathode follower 77 to a terminal 78 labeled "$V_A$."

It is well known from a trigonometric consideration that the slant range to a selected target from an aircraft may be obtained by the vector addition of the altitude of the aircraft and the ground range to the target. The altitude and the ground range vectors are in quadrature. It can be shown that the amplitude of the sine wave resulting from the addition of two quadrature sine waves, whose respective amplitudes are proportional to altitude and ground range, will be proportional to the slant range to the target. It will now be assumed that the tap 24 on potentiometer 21 is at ground potential so that the output of amplifier 34 and at terminal 36 will be determined by the setting of potentiometer 13. With $V_A$ properly set by adjustment of potentiometer 51 the potentiometer 13 is adjusted until a tracking pip whose time of generation is dependent upon $V_L$ coincides with the return echo from the selected target. A circuit arrangement suitable for accomplishing this is shown in the aforementioned copending patent application of Byron L. Havens and John J. Lentz. Since the position in time of the return echo from the selected target represents instantaneous slant range, the voltage $V_L$ must also represent instantaneous slant range; and, therefore, if the slant range and altitude voltages are correct, the ground range voltage, $V_G$, at terminal 36 will also be correct. The motor 25 is now started, and the potentiometer 14 is properly adjusted so that the ground range is reduced at the correct rate to maintain coincidence between the tracking pip and the return echo from the selected target. From an examination of the circuit of the accompanying drawing, it will be seen that the output signals from the cathode-follower 18 and the inverter 31 are in 180-degree phase opposition and that the amplitude of the output of inverter 31 will be subtracted from the output of cathode-follower 18 to produce $V_G$.

It can be shown that the slant range at which a bomb should be released is given by $$\sqrt{[T_f \cdot S_c - T]^2 + A^2}$$

wherein $T_f$ is the time of fall of the bomb, $S_c$ is the closing speed between the aircraft and its target, T is the trail of the bomb measured in appropriate units and A is the altitude of the aircraft. It will be seen that this is the solution for the hypotenuse of a right triangle having one side, A, and one side, $T_f \cdot S_c - T$. It will be further seen that it may be solved by the addition of sinusoidal quadrature voltages whose amplitudes are respectively proportional to A and to $T_f.S_c-T$. It has been stated that the potentiometer 14 is adjusted so that the proper rate of decrease in $V_G$ and $V_L$ is obtained. Since the output of cathode follower 18 is constant, and since the potentiometer tap 24 is moved uniformly, the voltage at the cathode of tube 20 must be proportional to $S_c$, the closing speed between the aircraft and its target. This voltage is multiplied by the time of fall, $T_f$, of the bomb by properly setting the tap 42 on potentiometer 41. The setting thereof may be determined by reference to suitable charts. The voltage on tap 42, proportional to $T_f.S_c$ now has subtracted from it a voltage proportional to T. The magnitude of the subtractive voltage T is set by properly adjusting the tap 44 on potentiometer 43. It will be seen that the transformer 15 and potentiometer 43 are so connected that trail may be additive if desired. Such a circumstance might present itself where a stick of bombs is to be dropped and it is desired to cause their center of gravity to strike the selected target. The voltage at the tap 44 is now proportional to $T_f.S_c-T$ and since it is a sinusoidal voltage in quadrature with the output of cathode-follower 53, it may be added thereto to produce at the input of amplifier 71 a voltage proportional to the resultant slant range at which the bomb should be released. This voltage is rectified and filtered to provide a unidirectional voltage output, $V_R$, at terminal 76.

Additional features may be added to the present embodiment without departing from the scope of the invention. Such features may well include multiple switches by which various voltage divider ratios may be inserted in the circuits associated with potentiometer 14 and 41 to permit computations to be made for two or more ranges of slant range, for example, zero to 10 miles and zero to 30 miles. Likewise the circuits associated with the potentiometer 51 may be altered to permit computation of data for two or more ranges of altitude, for example, near five thousand feet and near twenty thousand feet. Furthermore, various potentiometers and biasing arrangements may be added to the various amplifiers and cathode follower circuits to permit an initial calibration of the apparatus.

It is, of course, to be realized that while the present invention provides such voltages as required by the system shown in the above cited disclosure of Byron L. Havens and John J. Lentz, it is to be understood that only those voltages which are desired may be generated and that they may be either sinusoidal or unidirectional as desired.

While there has been described what is at present considered the preferred embodiment of the invention, it will be obvious to those skilled in the art that various changes and modifications may be made therein without departing from the invention.

What is claimed is:

1. In electrical computer apparatus of the character disclosed for use on aircraft in conjunction with a target bombing system for obtaining a signal $V_R$ required by the system and corresponding to the resultant slant range utilized for releasing a bomb, in combination, generator means constructed and arranged to supply two A.-C. signals of the same frequency and displaced substantially 90 degrees in phase, adjustable means connected to said generator means and having one of said A.-C. signals applied thereto for obtaining a $V_A$ signal corresponding to the altitude of the aircraft, means operatively connected to said generator means and having the second of said A.-C. signals applied thereto for obtaining an $S_c$ signal corresponding to the closing speed between the aircraft and its target, a first potentiometer having a first adjustable arm and having said $S_c$ signal applied thereacross, said first arm being manually set in accordance with the value of the time of fall of the bomb $T_f$, first adding means including a second potentiometer operatively connected to said first arm and to said generator means and having said second A.-C. signal applied thereto, said second potentiometer having a second arm manually set in accordance with the trail of the bomb T measured in preselected units, said first adding means being constructed and arranged for supplying a signal corresponding to $T_f.S_c-T$, and second adding means having said last named signal and said $V_A$ signal applied thereto for providing said $V_R$ signal said $V_R$ signal being the resultant of the vectoral summation of said signal corresponding to $T_f.S_c-T$ and said $V_A$ signal.

2. In electrical computer apparatus of the character disclosed for use on aircraft in conjunction with a target bombing system for obtaining a signal $V_R$ required by the system and corresponding to the resultant slant range utilized for releasing a bomb, in combination, generator means constructed and arranged to supply two A.-C. signals of the same frequency and displaced substantially 90 degrees in phase, a first potentiometer connected to said generator means and having one of said signals applied thereacross, said first potentiometer having a first adjustable arm manually set in accordance with the altitude of the aircraft for supplying a $V_A$ signal corresponding to said altitude, means operatively connected to said generator means and having the second of said A.-C. signals applied thereto for obtaining an $S_c$ signal corresponding to the closing speed between the aircraft and its target, a second potentiometer having a second adjustable arm and having said $S_c$ signal applied thereacross, said second arm being manually set in accordance with the value of the time of fall of the bomb $T_f$, transformer means operatively connected to said generator means and having said second A.-C. signal applied thereacross, first adding means including a third potentiometer operatively connected to said second arm and to said transformer means, said third potentiometer having a third arm manually set in accordance with the trail of the bomb T measured in preselected units, said first adding means being constructed and arranged for supplying a signal corresponding to $T_f.S_c-T$, and second adding means having said last named signal and said $V_A$ signal applied thereto for providing said $V_R$ signal said $V_R$ signal being the resultant of the vectoral summation of said signal corresponding to $T_f.S_c-T$ and said $V_A$ signal.

3. In electrical computer apparatus of the character disclosed for use on aircraft in conjunction with a target bombing system for obtaining a signal $V_R$ required by the system and corresponding to the resultant slant range utilized for releasing a bomb, in combination, generator means constructed and arranged to supply two A.-C. signals of the same frequency and displaced substantially 90 degrees in phase, a first potentiometer connected to said generator means and having one of said signals applied thereacross, said first potentiometer having a first adjustable arm manually set in accordance with the altitude of the aircraft for suplying a $V_A$ signal corresponding to said altitude, cathode follower means operatively connected to said generator means and having the second of said A.-C. signals applied thereto, said cathode follower means having a second potentiometer in the load circuit thereof, motor means operatively connected to said cathode follower means, said motor means and cathode follower means being adapted to supply to said second potentiometer an $S_c$ signal corresponding to the closing speed between the aircraft and its target, said second potentiometer having a second adjustable arm, said second arm being manually set in accordance with the value of the time of fall of the bomb $T_f$, transformer means operatively connected to said generator means and having said second A.-C. signal applied thereacross, first adding means including a third potentiometer operatively connected to said second arm and to said transformer means, said third potentiometer having a third arm manually set in accordance with the trail of the bomb T measured in preselected units, said first adding means being constructed and arranged for supplying a signal corresponding to $T_f.S_c-T$, and second adding means having said last named signal and said $V_A$ signal applied thereto for providing said $V_R$ signal said $V_R$ signal being the resultant of the vectoral summation of said signal corresponding to $T_f.S_c-T$ and said $V_A$ signal.

4. In electrical computer apparatus of the character disclosed for use in an aircraft target bombing system in conjunction with radar apparatus adapted for ascertaining the instantaneous slant range to the target, said radar apparatus being adapted to have a slant range signal applied thereto and to indicate when the value of the slant range signal corresponds to the true slant range of the target, said computer apparatus being constructed and arranged for obtaining a signal $V_G$ corresponding to the instantaneous ground range to the target, in combination, A.-C. generator means constructed and arranged to supply two A.-C. generator signals of the same frequency and displaced substantially 90 degrees in phase from each other, first manually adjustable means connected to said generator means and having one of said generator signals applied thereto for obtaining a $V_A$ signal corresponding to the altitude of the aircraft, second manually adjustable means connected to said generator means and having the other of said generator signals applied thereto for obtaining an output signal which corresponds in value to the $V_G$ signal when the second manually adjustable means is adjusted to a preselected condition, and adding network means operatively connected to said first and second adjustable means and having said output signal and $V_A$ signal applied thereto, said network means being constructed and arranged to supply a resultant signal, said resultant signal being adjusted in value by adjusting said second manually adjustable means until the radar apparatus indicates the resultant signal corresponds to a true slant range signal, said $V_G$ signal corresponding to true ground range while said resultant signal corresponds in value to the true slant range.

5. Electrical computer apparatus of the character disclosed for use on aircraft in conjunction with a target bombing system for obtaining a plurality of signals required in the system and including a $V_{REF}$ signal of predetermined phase and amplitude, a $V_G$ signal corresponding in amplitude to the ground range to the target, A $V_L$ signal corresponding in amplitude to the instantaneous slant range to the target, a $V_A$ signal corresponding to the altitude of the aircraft, and a $V_R$ signal corresponding to the resultant slant range utilized for releasing a bomb, comprising, in combination, generator means for producing first and second A.-C. voltages of the same frequency displaced substantially ninety degrees from each other, first cathode follower means operatively connected to said generator means and energized by said first voltage for producing said $V_{REF}$ signal, a first potentiometer having said first voltage applied thereacross and having a first adjustable arm, second cathode follower means connected to said first arm, a second potentiometer energized by said first voltage and having a second adjustable arm set to a predetermined setting, third cathode follower means connected to the last named arm and having third and fourth potentiometers connected in parallel and across which the last named follower output voltage is delivered, said third and fourth potentiometers having third and fourth adjustable arms respectively, adjustable motor means connected to said third arm for continuously adjusting the setting thereof in accordance with the speed of the travel of the aircraft toward the target, inverter means connected to said third arm and energized therefrom, a first resistance adding network energized from said second cathode follower means and inverter means for supplying said $V_G$ signal when said first arm is adjusted to a selected setting, a fifth potentiometer connected to said generator means and energized by said second voltage, said fifth potentiometer having a fifth adjustable arm, said fifth arm being manually adjustable in accordance with the altitude of the aircraft to provide said $V_A$ signal, a second resistance adding network operatively connected to said fifth arm and to said first network to have said $V_A$ signal and the output of said first network applied thereacross and constructed and arranged to supply said $V_L$ signal when said first arm is adjusted to a preselected position as determined by the value of said $V_G$ signal, and computer means operatively connected to said fifth arm, to said fourth arm, and to said generator means for providing said $V_R$ signal.

References Cited in the file of this patent

UNITED STATES PATENTS

| Number | Name | Date |
|---|---|---|
| 2,408,081 | Lovell | Sept. 24, 1946 |
| 2,466,879 | Doba | Apr. 12, 1949 |
| 2,488,448 | Townes | Nov. 15, 1949 |
| 2,489,907 | Lakatos | Nov. 29, 1949 |